United States Patent [19]
Schramm et al.

[11] Patent Number: 5,894,023
[45] Date of Patent: Apr. 13, 1999

[54] APPARATUS FOR INJECTION-MOLDING THREE-LAYER MOLDINGS

[75] Inventors: Klaus Schramm, Essen; Michael Blank, Wuppertal, both of Germany

[73] Assignee: Fried. Krupp AG Hoesch-Krupp, Essen, Germany, DEX

[21] Appl. No.: 08/767,113

[22] Filed: Dec. 4, 1996

[30] Foreign Application Priority Data

Feb. 19, 1996 [DE] Germany .................. 196 06 045

[51] Int. Cl.⁶ .................................................. B29C 45/22
[52] U.S. Cl. ................... 425/130; 264/328.8; 425/572; 425/588
[58] Field of Search ........................ 425/533, 549, 425/564, 562, 572, 588, 130; 264/513, 328.8

[56] References Cited

U.S. PATENT DOCUMENTS

| | | | |
|---|---|---|---|
| 3,981,672 | 9/1976 | Wilson | 425/532 |
| 4,492,556 | 1/1985 | Crandell | 425/568 |
| 4,516,927 | 5/1985 | Yoshida | 425/568 |
| 4,863,665 | 9/1989 | Schad et al. | 264/328.8 |
| 4,869,862 | 9/1989 | Bryan | 425/532 |
| 5,102,602 | 4/1992 | Ziegler | 425/532 |
| 5,254,305 | 10/1993 | Fernandez et al. | 425/568 |
| 5,389,331 | 2/1995 | Uehara et al. | 264/328.8 |
| 5,443,767 | 8/1995 | Cahill | 264/513 |

*Primary Examiner*—Tim Heitbrink
*Attorney, Agent, or Firm*—Max Fogiel

[57] ABSTRACT

Apparatus of injection molding three-layer moldings, especially bottle blanks with an inner and an outer layer of polyethylene terephthalate and a middle layer of recycled polyethylene terephthalate, employing a mold with several cavities. The material (component A) for the inner and outer layers is supplied through one molten-component conveying channel and the material (component B) for the middle layer through another molten-component conveying channel. The channels are separately heated and their temperatures independently regulated. The melt for component A flows the same distance as the melt for component B. The melts flow into the injection-molding dies such as to ensure a uniform front.

15 Claims, 20 Drawing Sheets 5,894,023

APPARATUS FOR INJECTION-MOLDING THREE-LAYER MOLDINGS

BACKGROUND OF THE INVENTION

The present invention concerns a method of injection-molding three-layer moldings, especially bottle blanks with an inner and an outer layer of polyethylene terephthalate and a middle layer of recycled polyethylene terephthalate. The method employs a mold with several cavities.

The invention is not, however, restricted to either bottle blanks or polyethylene terephthalate. It can also be employed to make moldings for any purpose and out of any plastic or combination thereof. It can for example be employed to injection mold multiple-layer blanks of polyethylene terephthalate and polyethylene naphthalate. Although both polyethylene terephthalate and polyethylene naphthalate are polyesters, the terephthalate has much better heat-resistance, mechanical, and barrier properties. It is relatively new but has already been approved by the various governmental agencies as a packaging material for the foodstuffs industry. Due to its outstanding properties, even small percentages, 10 to 25% by molding weight, definitely increase the quality of the final bottles. Bottles of polyethylene terephthalate or phthalate are particularly useful for example for bottling hot juices and for storage in hot climates.

The middle layer, made of a material called component B hereinafter, constitutes the core of the bottle wall, and the inner and outer layer, of "component A", constitute a continuous skin.

A device for carrying out such a method is known from European Patent 0 647 514 A1. The melts are supplied to the dies through a series of channels consisting of a number of bores extending through a hot-runner block. Components A and B are accordingly always at the same temperature.

The pins that close the die in this known device are pneumatically driven in accordance with the two-piston principle by two independently acting pistons accommodated in a single housing and subjected to different pressures. It is impossible to ensure synchronized opening and closing of the molten-component conveying channels that open into the various cavities and hence to obtain a uniform flow front because the compressed air responds compressibly, subsequent to a delay, that is, in accordance with the specific opening-and-closing impedances. It will not respond uniformly. The requisite synchronization of all the cavities cannot be attained, and the blanks will have different percentages of components A and B in their layers.

Another drawback of the known device is the impossibility of controlling the flow of melt or even to keep it flowing into the cavities when shifting back and forth between the components. The result is flow lines on the surface of the blank. This is because the flow of the components is also controlled by the injection pistons.

SUMMARY OF THE INVENTION

The object of the present invention is accordingly to eliminate the drawbacks that accompany the aforesaid method when it is carried out with known devices and to improve both the method and the device to the extent that the flow front will keep advancing and will be simultaneous in all the cavities. The percentage of component B in the middle layer is also intended to be as high and reproducible as possible.

This object is attained in accordance with the present invention in a method of the aforesaid genus in that the material (component A) for the inner and outer layers is supplied through one channel and the material (component B) for the middle layer through another channel, whereby the channels can be separately heated and their temperatures independently regulated, in that the melt for component A flows the same distance as the melt for component B, and in that the melts flow into the injection-molding dies such as to ensure a uniform front.

The separate heating and independent temperature regulation of the molten-component conveying channel channels ensure that, in spite of the different physical properties, the flow of both components and the percentage of material in each can be very precisely distributed over all the cavities of the mold. The distribution will accordingly be very uniform both from cycle to cycle and within the same cycle.

The device for carrying out the method in accordance with the present invention includes two plasticizers, a molten-component collector, a hot-runner block, a hot-runner die part, and a lower-die insert. The object of the present invention is attained in that the hot-runner block comprises mutually insulated block parts with individual heaters, with a molten-component conveying channel for component A and a molten-component conveying channel for component B in each part.

Still another object of the present invention is a hydraulic piston-and-cylinder system particularly appropriate for actuating the die stoppers or mechanisms accommodating them in the present invention, although also applicable to other fields.

The hydraulic piston-and-cylinder system can include a cylinder, a piston rod, and a piston that pressure can be applied to each end of, whereby the cylinder can have two chambers separated by a partition with the piston rod extending through it, another piston can travel back and forth along the rod and inside the second chamber, the end of the second piston facing the partition and subjected to pressure can be provided with a bore and its other end can be subjected to a counteracting pressure, the piston rod can have a groove with a trapezoidal cross-section around it, and there can be a segmented ring between the partition and the second piston, the inside diameter of the ring can equal the diameter at the base of the groove, and the outside diameter of the ring is dimensioned to allow the inner surface of the bore through the second piston to slide back and forth over it.

The cross-section of the segments is in accordance with the present invention symmetrical and the contour of the inner demarcating surface of the ring matches the trapezoidal cross-section of the groove around the piston rod.

The hydraulic piston-and-cylinder system in accordance with the present invention allows the piston rod to be locked into any desired position. The system in the present case makes it possible to lock the piston rod when the die stoppers are in their middle position. Known hydraulic piston-and-cylinder systems can lock the piston only at one end of the stroke.

In the method in accordance with the present invention, the components A and B arrive from different plasticizers, the melts are of the right size for the screws, and the melts are supplied to the screw vestibule. Component B travels through a filter between the screw vestibule and the tool to remove any contaminants.

In simple and complex molds the cavities are filled by injecting component A first. Component B is then injected with as little disruption of the flow as possible. More component A is then injected in a secondary pressure-application phase. The secondary compression of component A is necessary to empty the vestibule of component B, so that it will accommodate pure component A during the next injection.

BRIEF DESCRIPTION OF THE DRAWINGS

Several embodiments of the present invention and parts thereof will now be specified with reference to the accompanying drawing, wherein.

DESCRIPTION OF THE PREFERRED EMBODIMENTS

Figure 1:
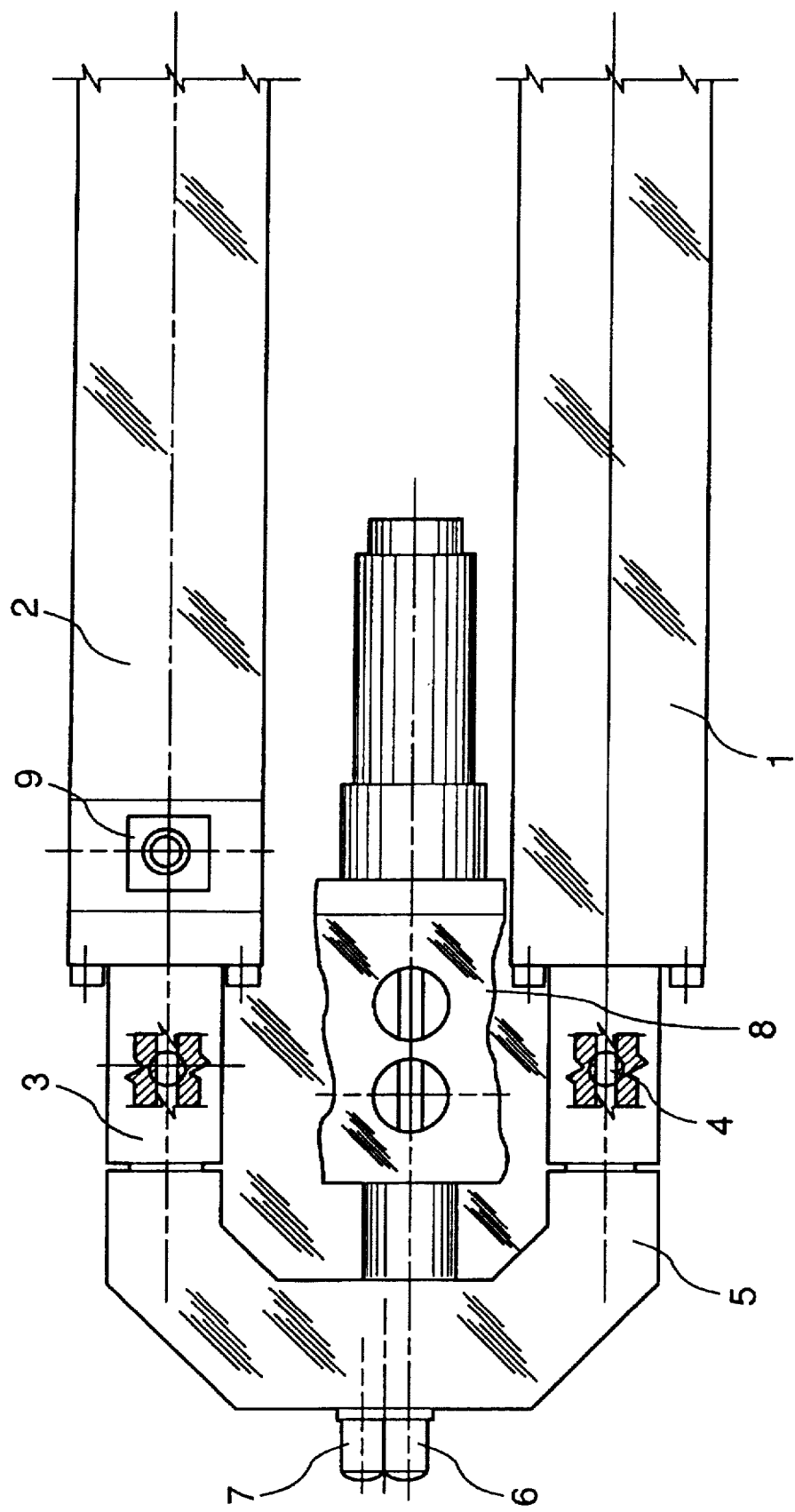
FIG. 1 is a top view of an injection-molding assembly.

The injection-molding assembly illustrated in FIG. 1 includes plasticizers 1 and 2. Component A is plasticized in plasticizer 1 and component B in plasticizer 2. The plasticizers communicate with machine dies 6 and 7 by way of intermediates 3 and a molten-component collector 5. Each intermediate 3 accommodates an intermediate-section obstructing bolt 4. Component A is injected through machine die 6 and component B through machine die 7. A module 8 mounted on molten-component collector 5 applies secondary pressure to component A. Plasticizer 2 accommodates a melt filter 9.

Figure 2:
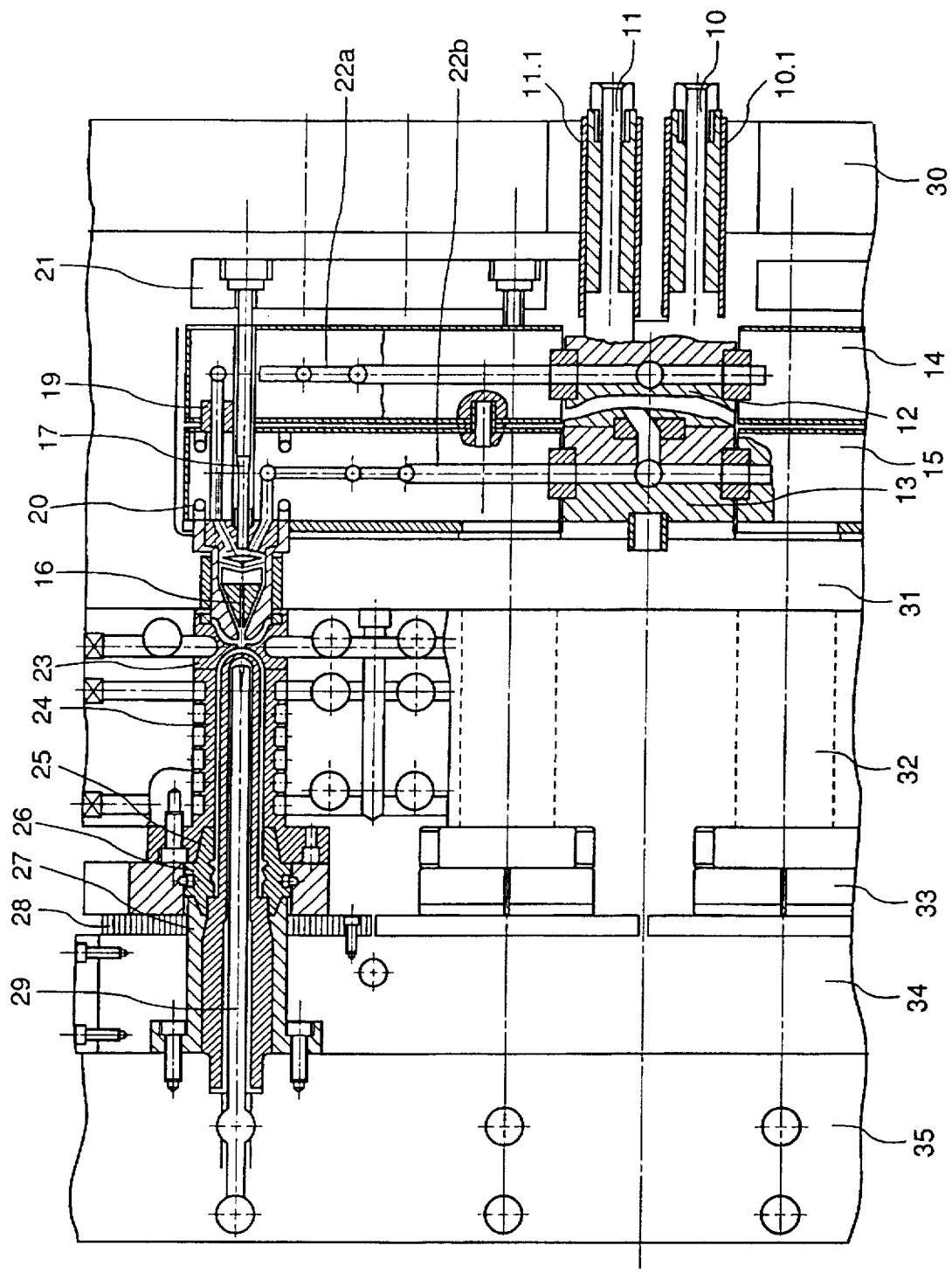
FIG. 2 is a partly sectional top view of a molding tool.

As will be evident from FIG. 2, the mold-on bushing 10 that component A is supplied to by way of machine die 6 is provided with a heater 10.1 and the mold-on bushing 11 that component B is supplied to by way of machine die 7 is provided with a heater 11.1. Mold-on bushings 10 and 11 communicate with intermediate hot-runner blocks 12 and 13 that convey components A and B to block parts 14 and 15. Block parts 14 and 15 communicate with an injection-molding die 16, which is opened and closed by an injection-molding die stopper 17. Block parts 14 and 15 communicate through intermediate hot-runner sections 19. Block parts 14 and 15 are mutually thermally insulated and provided with separate heaters 20. The end of injection-molding die stopper 17 remote from injection-molding die 16 is secured in a supporting plate 21.

Block part 14 accommodates a molten-component conveying channel 22a for component A and block part 15 a molten-component conveying channel 22b for component B. Injection-molding die 16 is connected to a lower-die insert 24 by a base plate 23. A threaded slide 25 accommodates a core 26, which is enclosed in an alignment sleeve 27. Also present are a sliding strip 28 and a core-cooling pipe 29. Mold-on bushings 10 and 11 are secured in a head plate 30 and injection-molding dies 16 in a hot-runner plate 31. The overall mold in the present device is essentially constituted by a lower-die plate 32. Threaded slides 25 are secured in slide strips 33. The mold terminates in a strip-off plate 34 and a core-ground plate 35.

Figure 3:
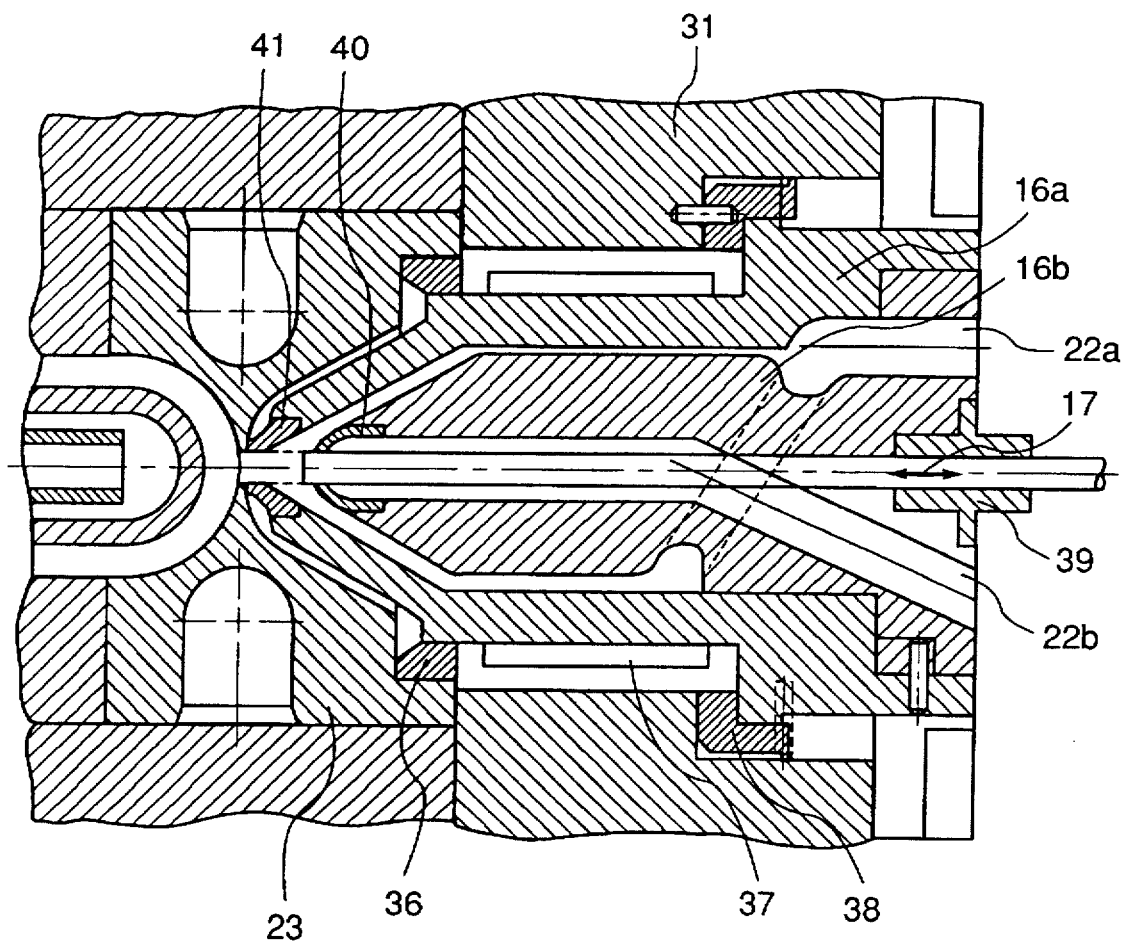
FIG. 3 illustrates the die from the tool illustrated in FIG. 2.

FIG. 3 illustrates an injection-molding die inserted in hot-runner plate 31. It comprises an outer die part 16a and an inner die part 16b. Molten component-A conveying channel 22a extends cylindrically between outer and inner die parts 16a and 16b. Molten component-B conveying channel 22b extends along the central axis of inner die part 16b. Between base plate 23, which communicates with hot-runner plate 31, and outer die part 16a is a centering ring 36. Resting against the circumference of outer die part 16a is a heater 37. Since heater 37 is closer to molten component-A conveying channel 22a, the temperatures in molten-component conveying channels 22a and 22b will differ. Between hot-runner plate 31 and outer die part 16a is an annular support 38. There is a mold-on insert 40 on the front end of inner die part 16b and a mold-on ring 41 on the front end of outer die part 16a.

Figure 4:
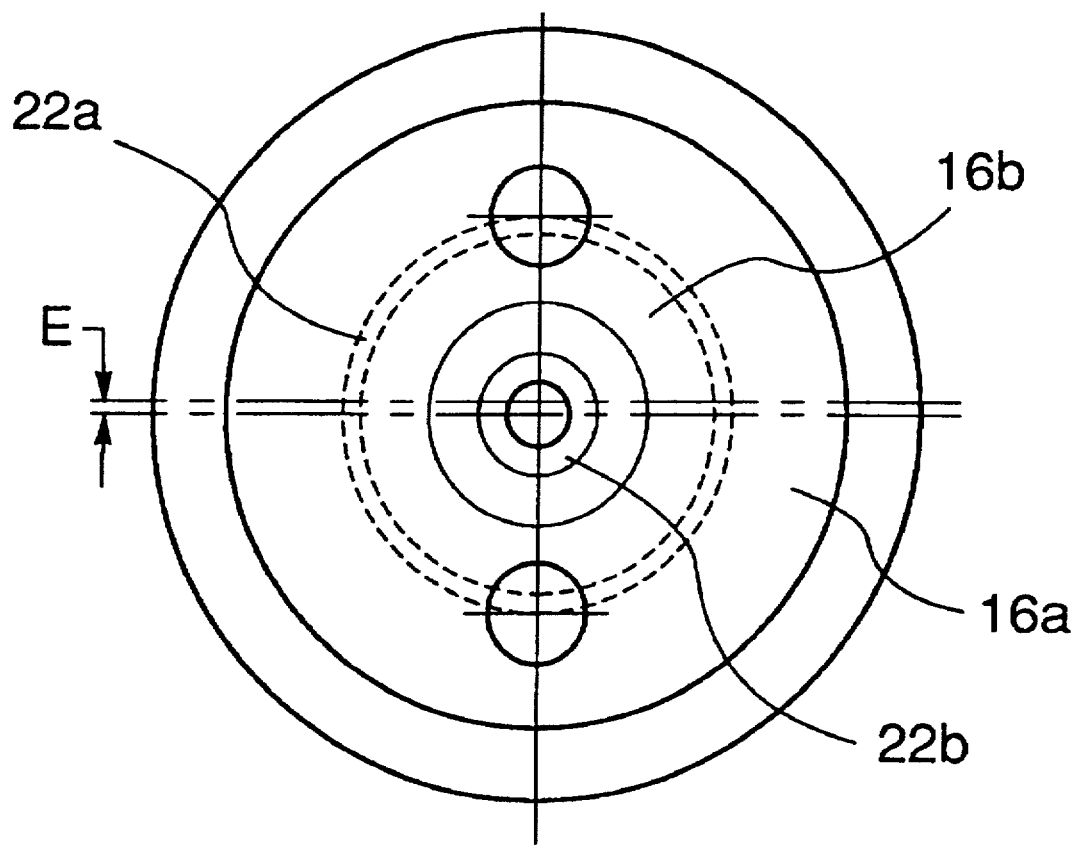
FIG. 4 is a cross-section through the die illustrated in FIG. 3.

As will be evident from FIG. 4, die parts 16a and 16b are mutually eccentric. The cross-section and length of molten-component conveying channels 22a and 22b ensure a uniform flow front.

Figure 5:
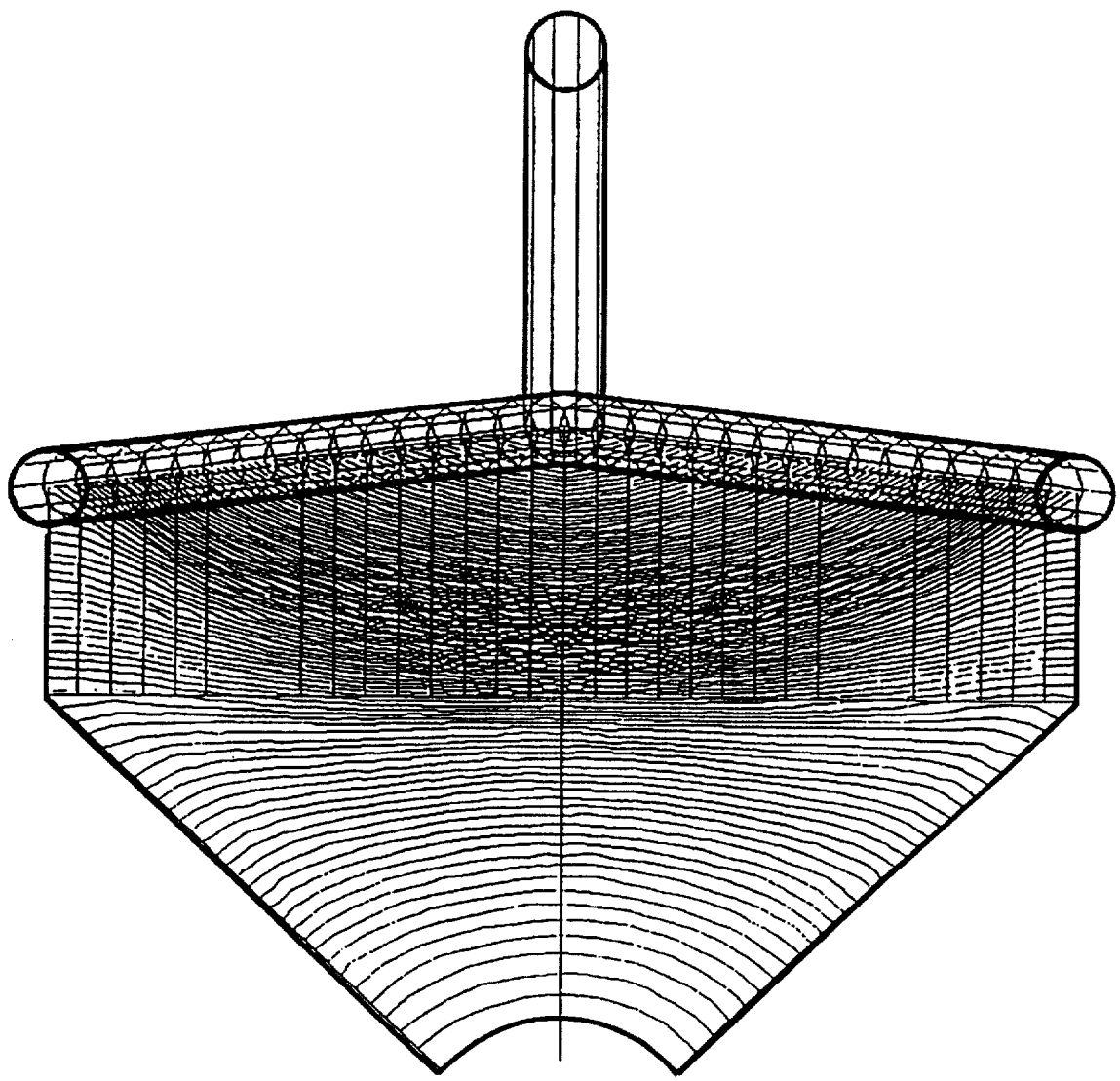
FIG. 5 is an isochoric drawing of a front.
Figure 6:
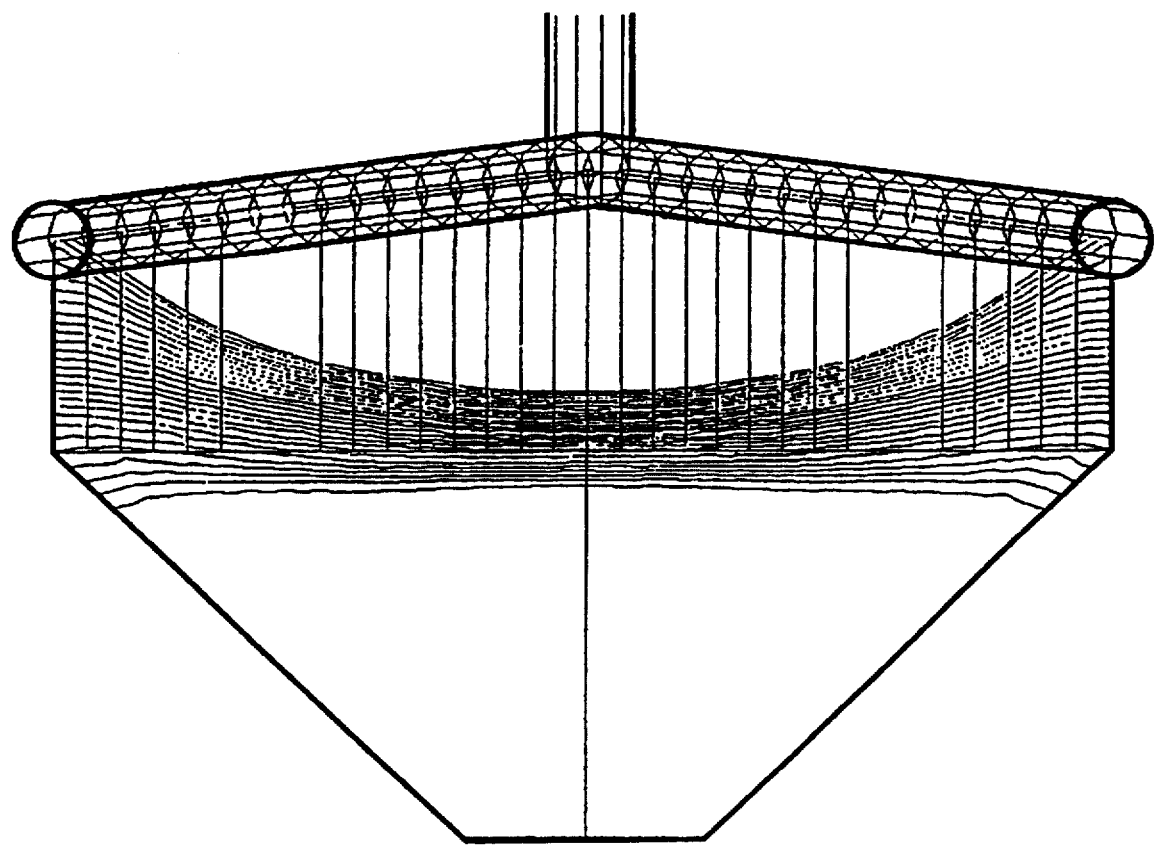
FIG. 6 is a scaled drawing of the front illustrated in FIG. 5.

The front uniformity accompanying the eccentricity of die parts 16a and 16b will be evident from FIGS. 5 and 6. FIG. 5 represents the front isochorically and FIG. 6 scaled. Eccentricity E, the displacement between outer die part 16a and inner die part 16b (FIGS. 3 & 4) is approximately 0.6 mm. FIGS. 5 and 6 illustrate by way of development of molten component-A conveying channel 22a the uniform flow front at the end of the quasicylindrical section of the die part.

Figure 7:
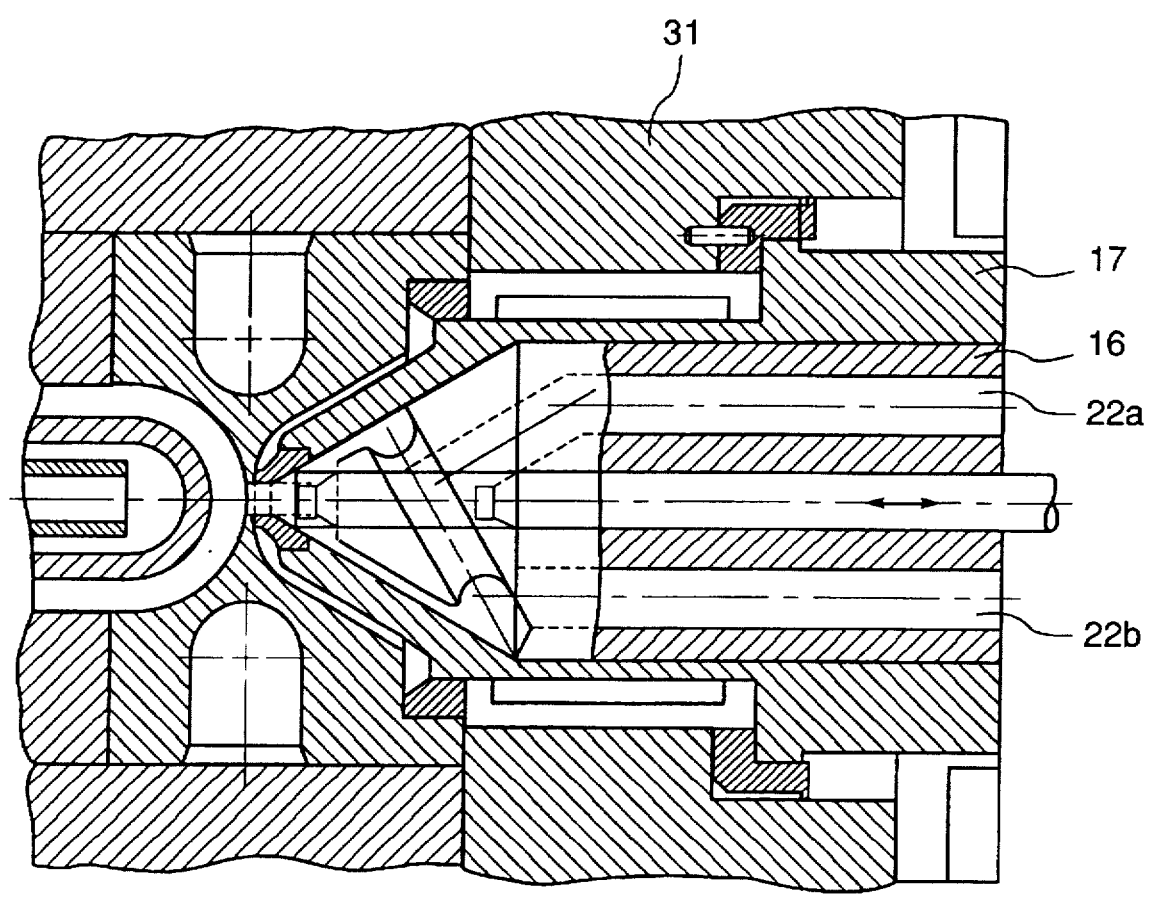
FIG. 7 is a view similar to FIG. 3 of another type of die.
Figure 8:
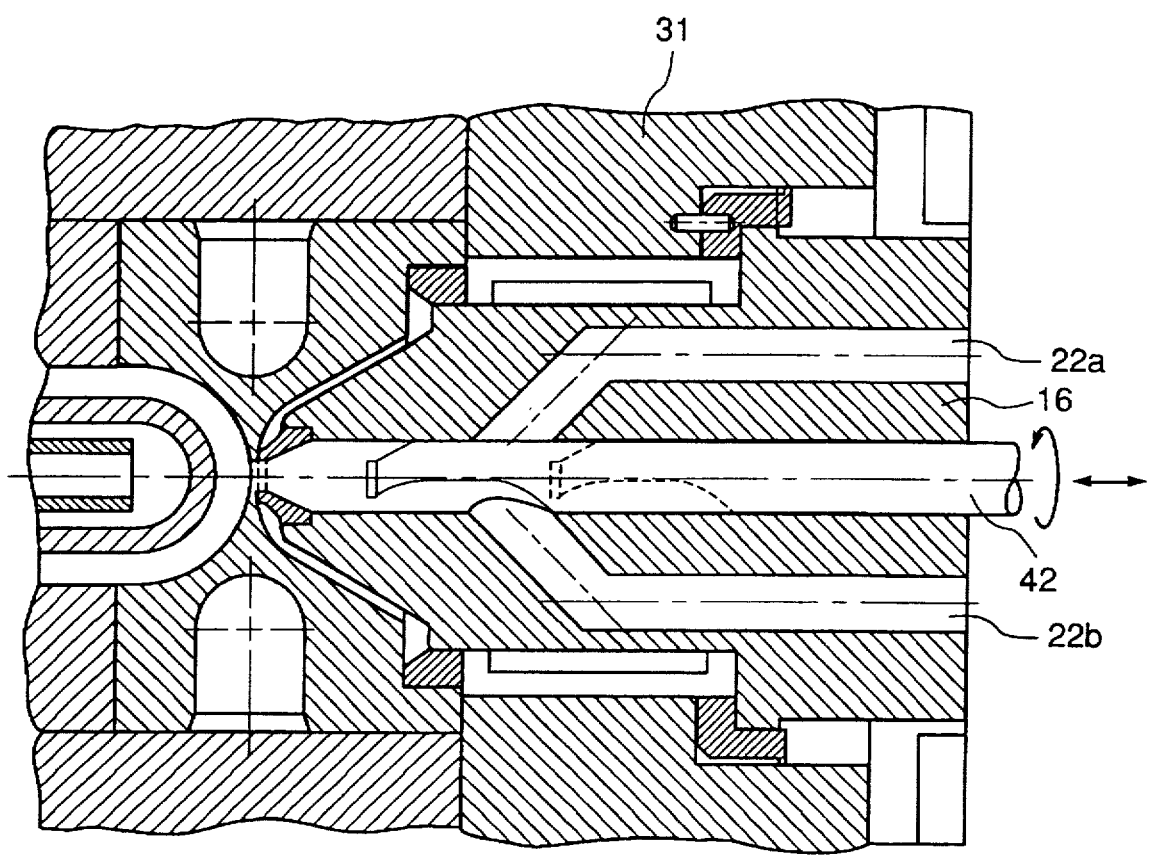
FIG. 8 is a view similar to FIG. 3 of a third type of die.

FIGS. 7 through 8 represent other embodiments of the injection-molding dies in hot-runner plate 31. The heaters 37 in these embodiments are equidistant from each molten-component conveying channel 22a and 22b. The different temperatures in molten-component conveying channels 22a and 22b are obtained by varying the windings in heater 37. The windings in the vicinity of 22a in other words will be looser or tighter than those in the vicinity of molten component-B conveying channel 22b.

The injection-molding die 16 in the embodiment illustrated in FIG. 8 is provided with a die stopper 42 that acts by displacement and rotation. Die stopper 42 interrupts the supply of component A and initiates that of component B by rotating. Injection begins with molten-component conveying channel 22a accessible to component A. To change to component B, molten-component conveying channel 22a is gradually closed and molten-component conveying channel 22b gradually opened at the same rate until channel 22a is completely closed and channel 22b completely open, as illustrated.

When the method in accordance with the present invention is carried out with the injection-molding die 16, the channel-filling procedure cannot be interrupted during the change from component A to component B and vice versa. The mass of both flowing components is identical. During change-over times $t_{u1}$ and $t_{u2}$ the sum of both flows is $\dot{m}_A$ or $\dot{m}_B$. When $t_{u1}=t_{u2}=(\dot{m}_A+\dot{m}_B)$, $\dot{m}_A=\dot{m}_B$ is the flow of melt before or after changeover.

Figure 24:
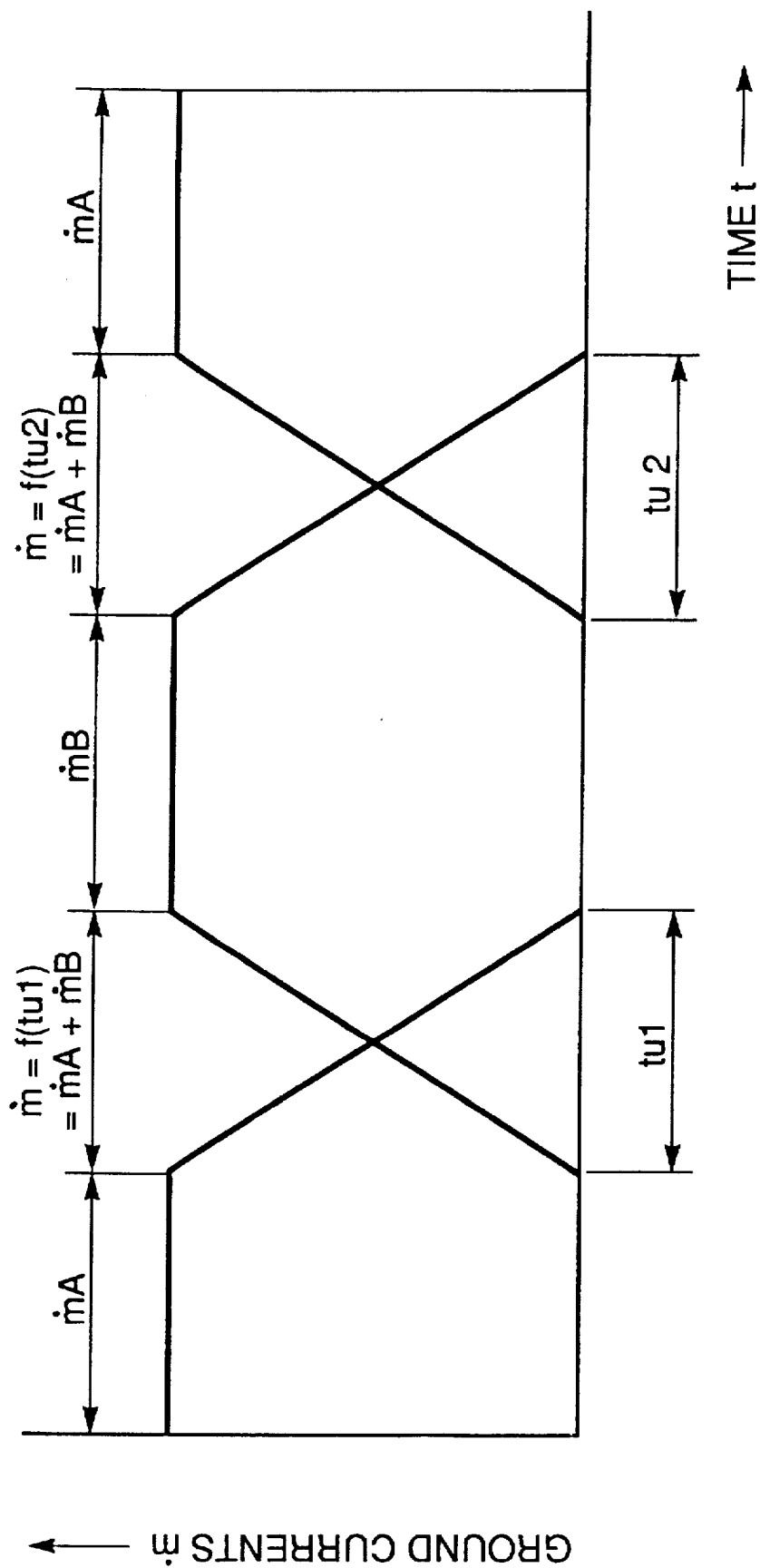
FIG. 24 is a graph of flow over time.

FIG. 24 illustrates how the channels are filled, assuming that the mass flow in the molten components A and B is constant. In practice the flow that occurs during changeover times $t_{u1}$ or $t_{u2}$ will remain constant on the assumption that die impedance w is the same for both components: $w_A=w_B$.

Assuming that the two components flow in very similar ways, total impedance during the changeover will be $$w_{A(u1)}+w_{B(u2)}=\text{constant}=w_A=w_B.$$

Accordingly, $$\dot{m}_{A(u1)}+\dot{m}_{B(u2)}=\text{constant}=\dot{m}_A+\dot{m}_B.$$

Any deviations from the ideal that occur in practice are insignificant.

Various changeover times can be set, whereby the changeover speed of the die stopper will be constant.

Figure 9:
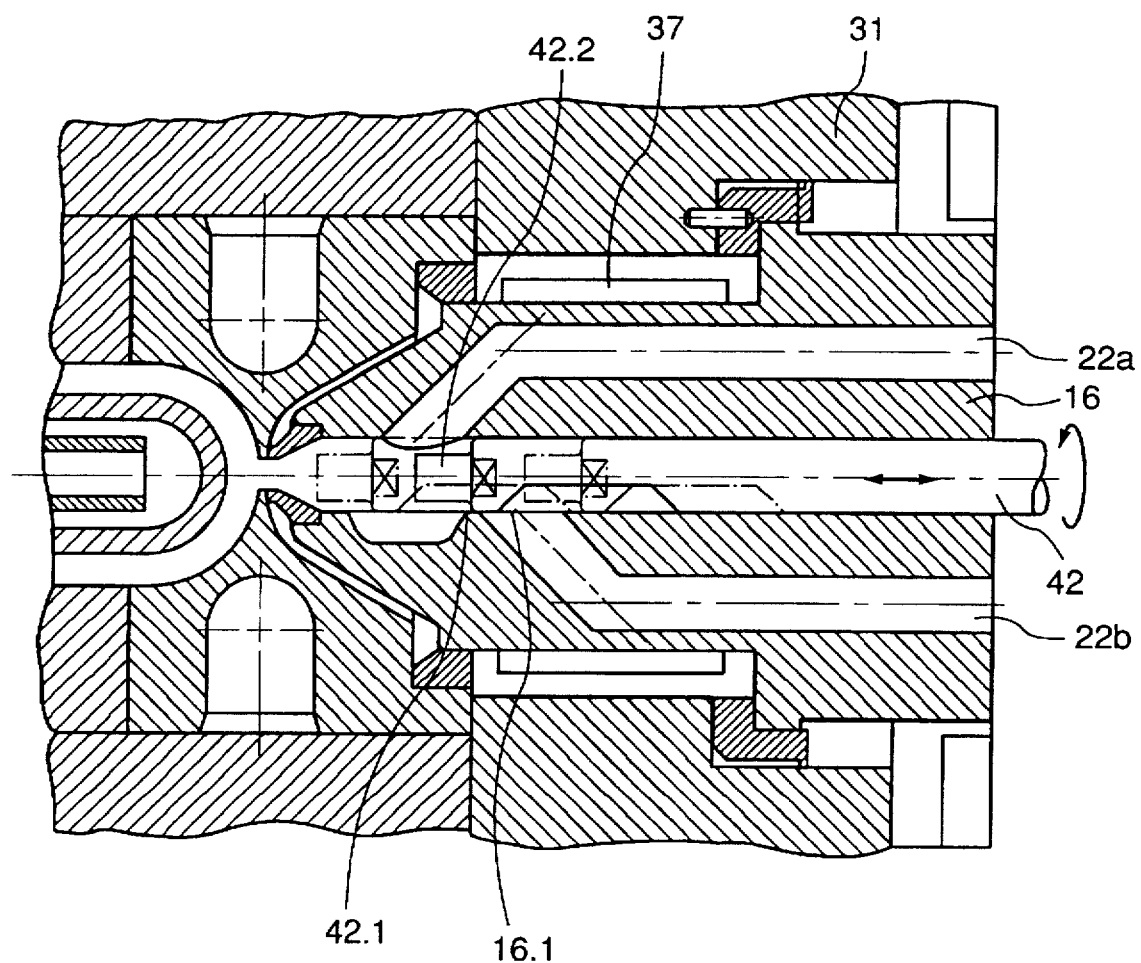
FIG. 9 is a view similar to FIG. 3 of a fourth type of die.

The die stopper 42 illustrated in FIG. 9 undergoes displacement and rotation. motions that are controlled by a contour 42.1 at the front that operates in conjunction with another contour 16.1 in injection-molding die 16. Motion-control contour 42.1 makes it possible to vary the ratio between the masses of the molten components A and B either progressively or degressively. The stopper has a pin 42.2 at the front.

Figure 10:
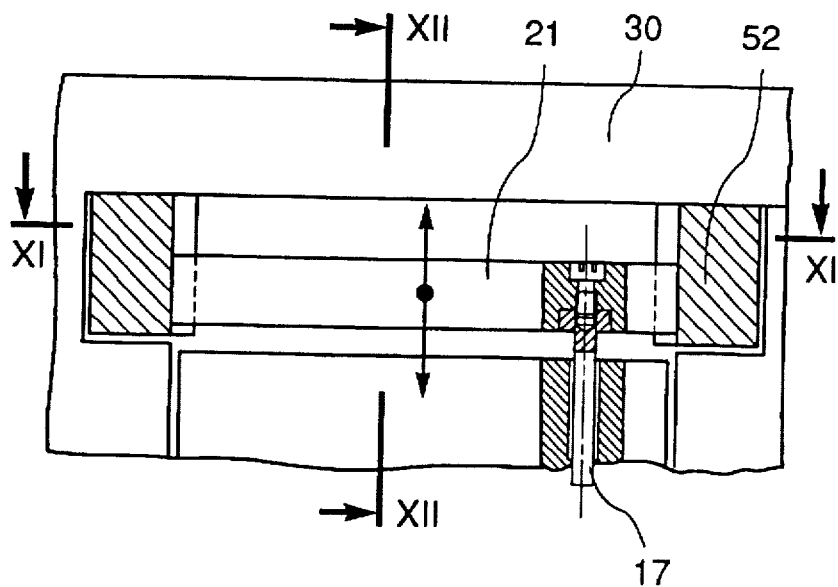
FIG. 10 is a top view of the head plate and supporting plate.
Figure 11:
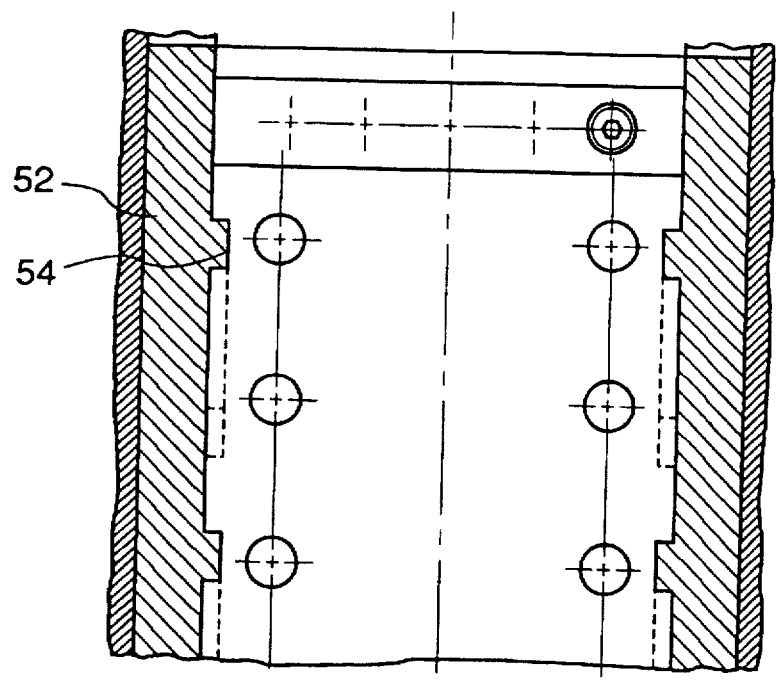
FIG. 11 is a section along the line XI—XI in FIG. 10.
Figure 12:
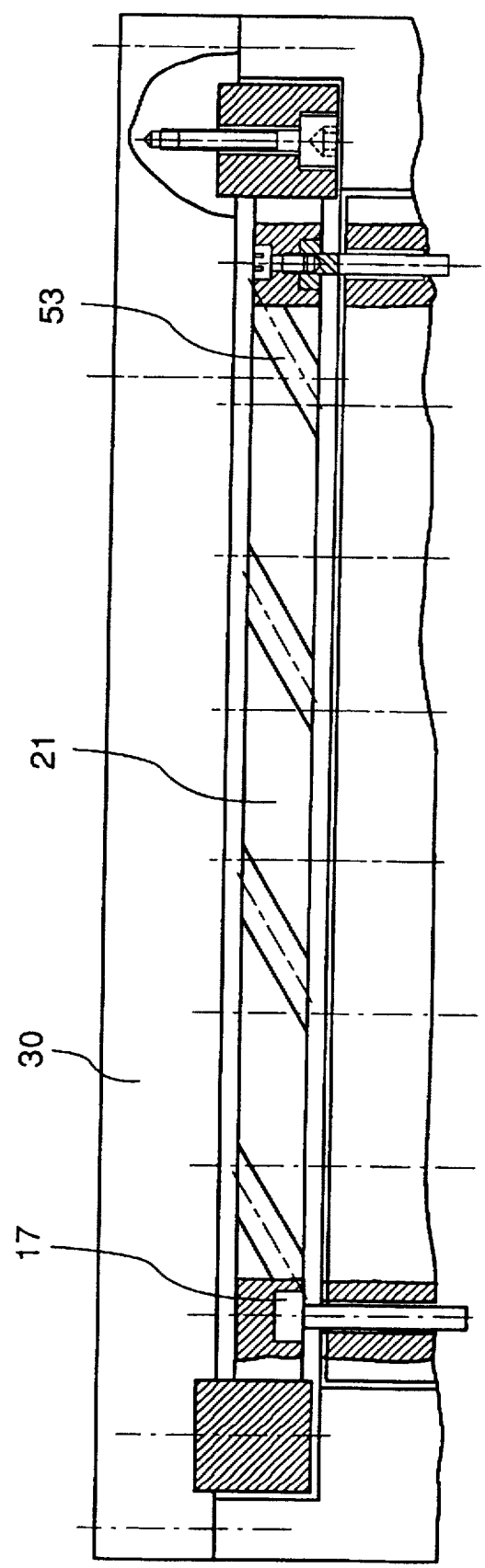
FIG. 12 is a section along the line XII—XII in FIG. 10.

FIGS. 10 through 12 illustrate head plate 30 and supporting plate 21 with injection-molding die stoppers 17 accommodated therein. The gaps 53 in supporting plate 21 are engaged by sloping cogs 54 on guide strips 52. Guide strips 52 are displaced by a hydraulic system (FIG. 22) and displace supporting plate 21 in turn. Since injection-molding die stoppers 17 are fastened to supporting plate 21, the plate's motions are transmitted to injection-molding die stoppers 17, ensuring that they all execute the same motion.

Figure 13:
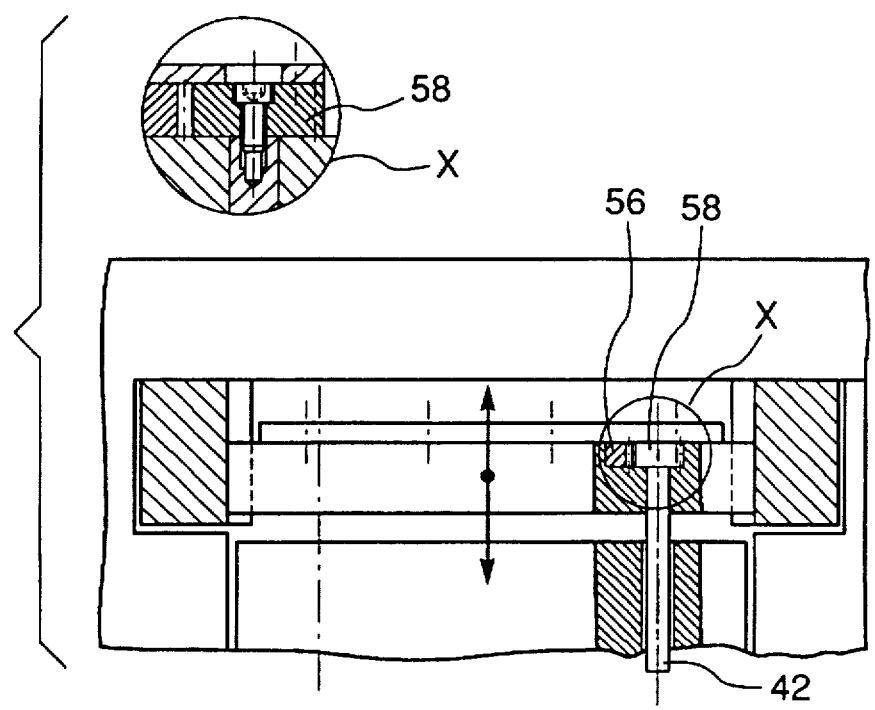
FIGS. 13 through 15 illustrate an embodiment different from that illustrated in FIGS. 10 through 12, FIGS. 16 though 18 illustrate another embodiment different from that illustrated in FIGS. 10 through 12.
Figure 14:
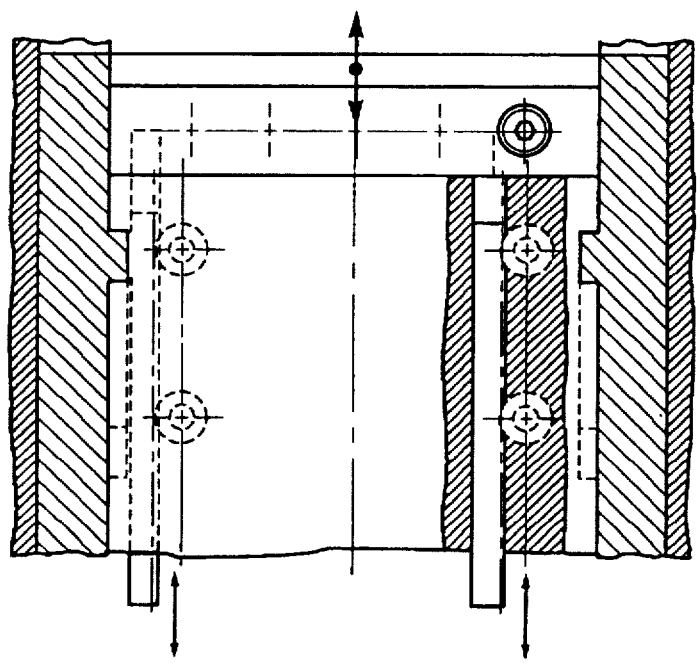
Figure 15:
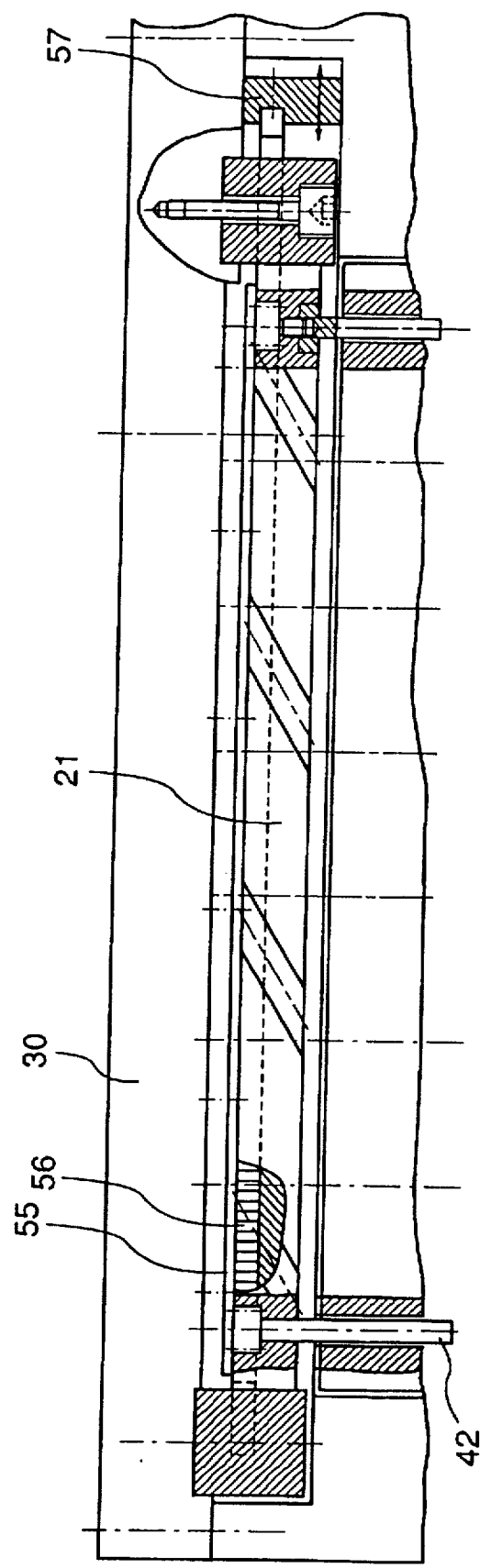

The die stoppers 42 in the embodiments illustrated in FIGS. 13 to 15 undergo displacement and rotation, meaning that they must be able to move longitudinally as well as to turn, simultaneously or not. A cogged rack 56 is secured for this purpose in supporting plate 21 by a terminating plate 55. Rack 56 can be shifted back and forth by a hydraulic system (FIG. 22) by way of an actuating strip 57. Every die stopper 42 is provided with a cogwheel 58 that engages rack 56.

Figure 16:
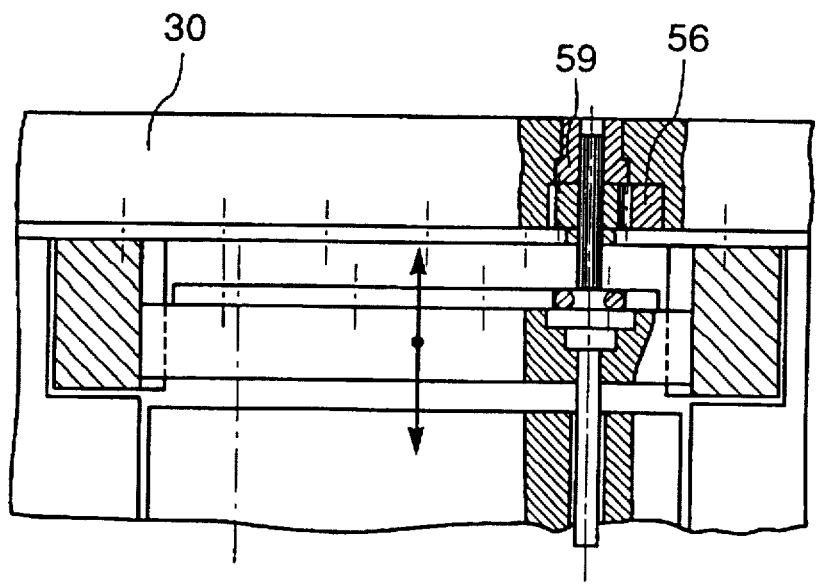
Figure 17:
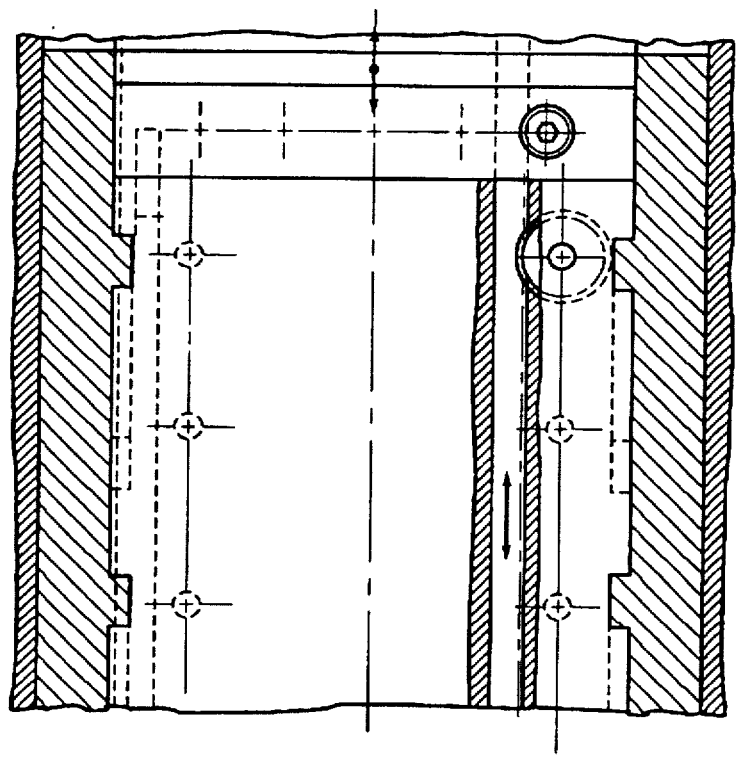
Figure 18:
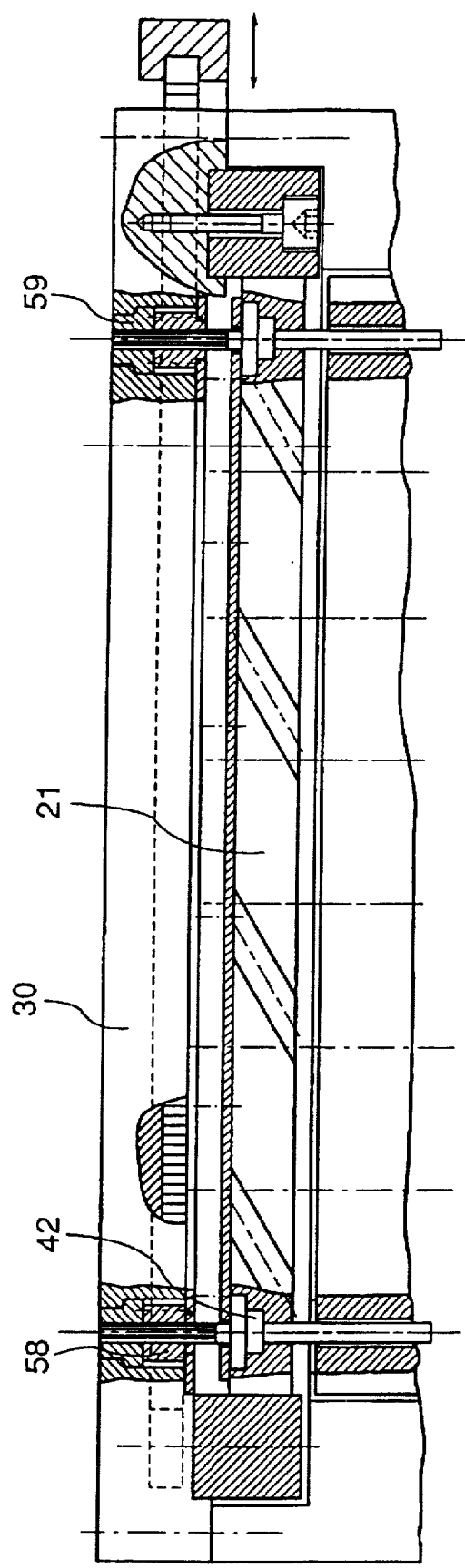

The dies stoppers 42 in the embodiment illustrated in FIGS. 16 to 18 undergo displacement and rotation. The end of the stoppers 42 remote from the injection-molding die travels back and forth in a alignment bushing 59 accommodated in head plate 30. The rack 56 that engages cogwheel 58 is also accommodated in head plate 30.

Figure 19:
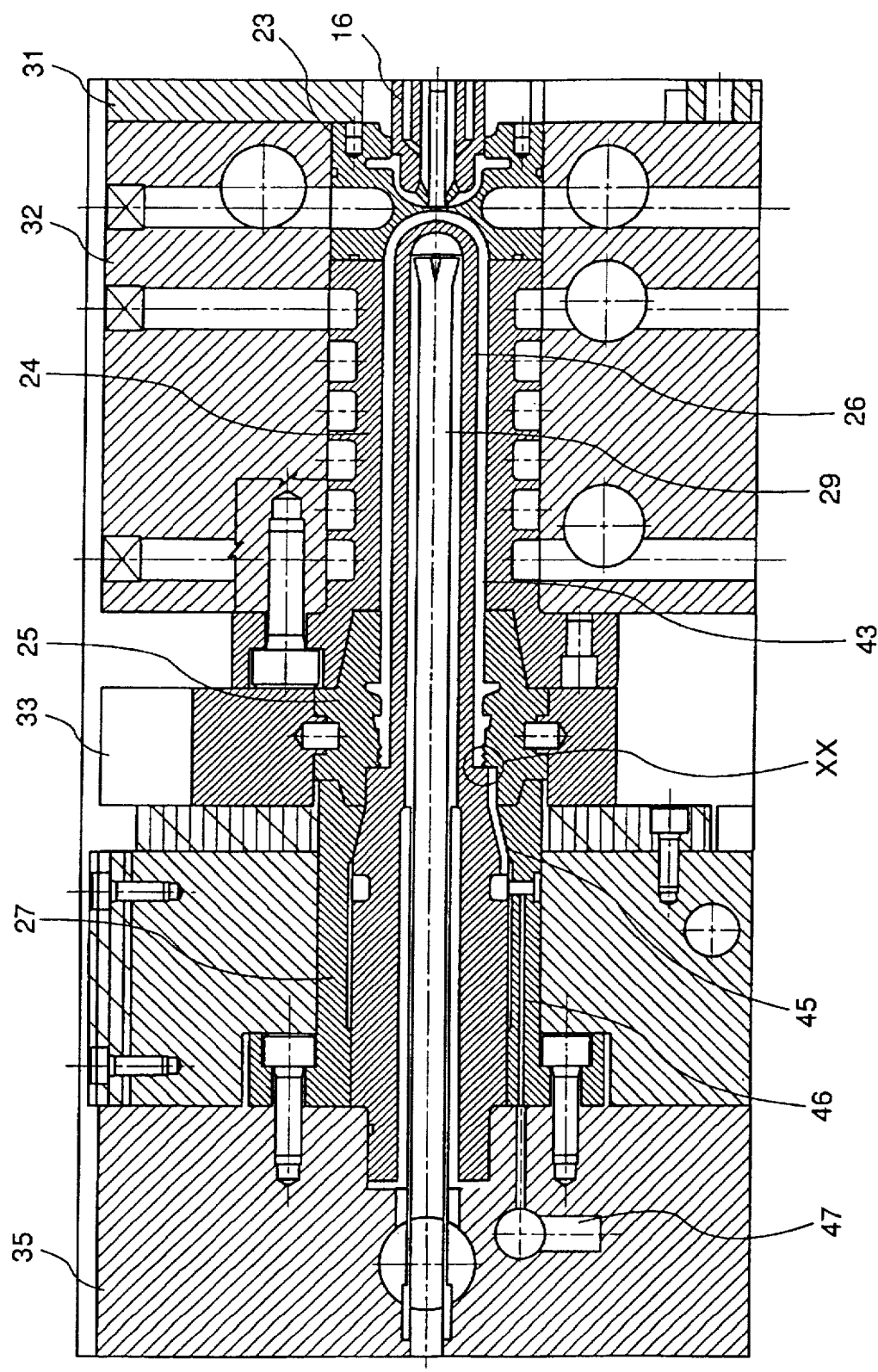
FIG. 19 is a section through the mold.

The mold in the device in accordance with the present invention is illustrated in FIG. 19. The front of injection-molding die 16 is accommodated in the base plate 23 nest to hot-runner plate 31. Insert 24 extends into lower-die plate 32 and encloses core 26 along with core-cooling pipe 29 and an initial-stage molding 43. Next to lower-die insert 24 is a threaded slide 25 that is enclosed in slide strip 33. There is slot-shaped vent 44 (FIG. 20) on the end of initial-stage molding 43 remote from injection-molding die 16 and between core 26 and threaded slide 25. Vent 44 opens into an air-escape channel 45 between core 26 and alignment sleeve 27. Air-escape channel 45 communicates by way of a vacuum channel 46 with a line 47 that leads to a reservoir 48 (FIG. 21).

Figure 20:
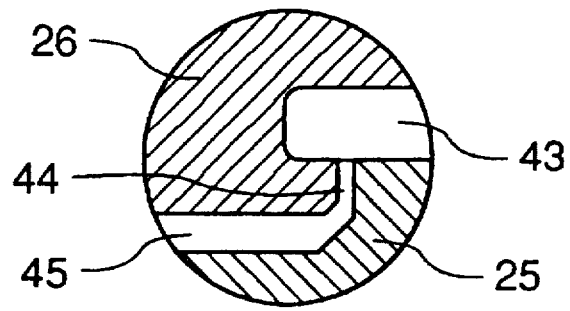
FIG. 20 is a detail of the area XX in FIG. 19.

The slot-shaped vent 44 on the end of initial-stage molding 43 between core 26 and threaded slide 25 is illustrated in FIG. 20 along with air-escape channel 45 at a substantially larger scale.

Figure 21:
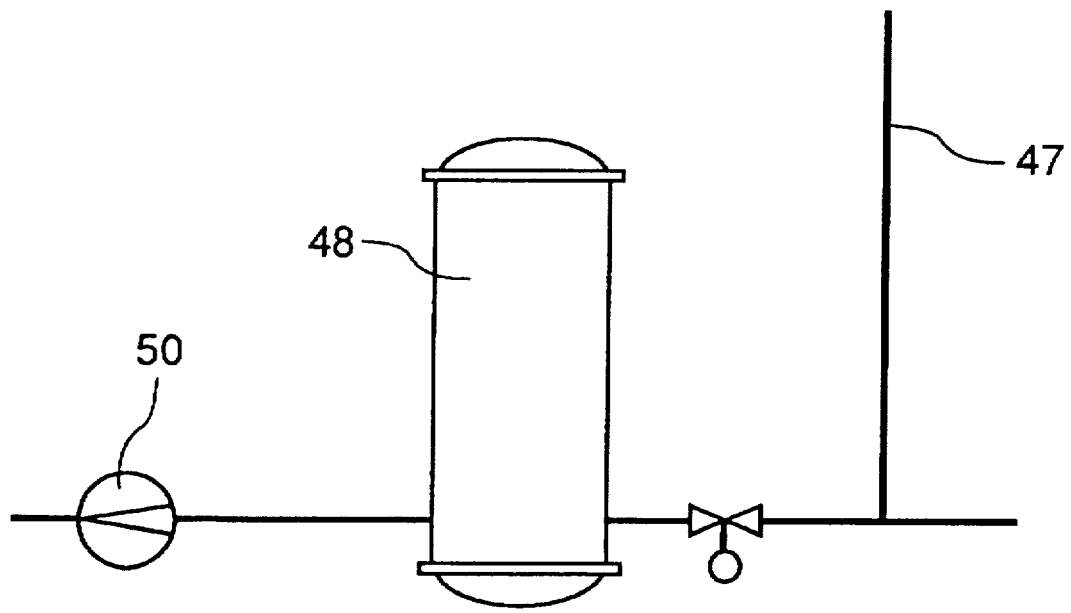
FIG. 21 illustrates a reservoir and vacuum pump.

The line 47 illustrated in FIG. 21 leads to a reservoir 48 that is at least extensively evacuated during the injection-molding procedure. The tool or its cavities are accordingly vacuumized for 0.2 to 0.3 once closed.

Figure 22:
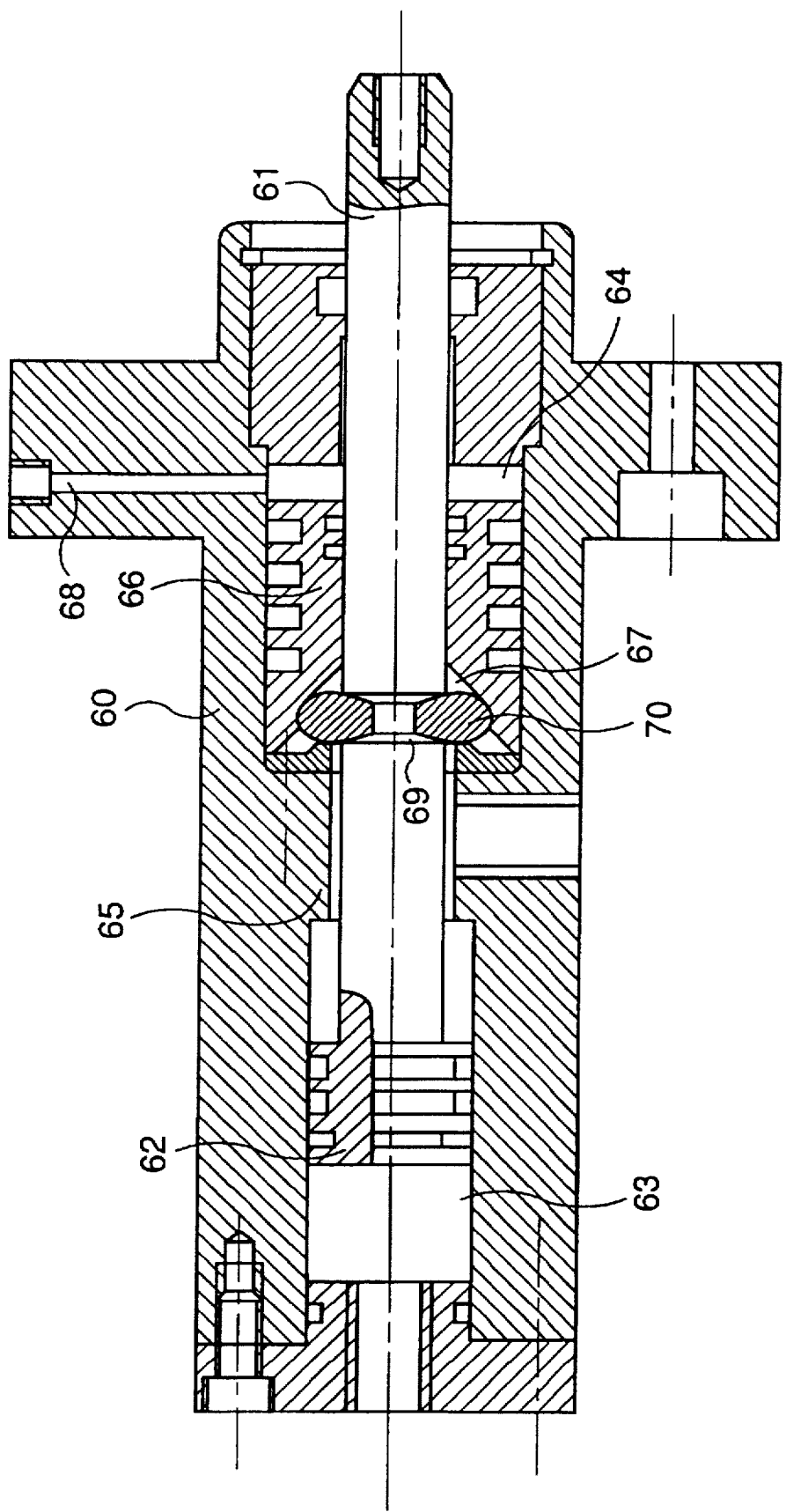
FIG. 22 illustrates a hydraulic piston-and-cylinder system.

The hydraulic system illustrated in FIG. 22 can be employed not only to actuate the closing components of the mechanisms that accommodate it in a device in accordance with the present invention (FIGS. 13–15), but also for any other purpose. It includes a cylinder 60, a piston rod 61, and a piston 62. Piston 62 is attached to piston rod 61 and can be subjected to pressure on each side. Cylinder 60 has two chambers 63 and 64. Piston rod 61 extends through the partition 65 between them. Second chamber 64 accommodates another piston 66. Second piston 66 slides back and forth along piston rod 61. The side of second piston 66 facing the partition 65 between chambers 63 and 64 can be subjected to pressure and is provided with a bore 67. The other side of second piston 66 is compressed by a fluid supplied through a line 68. The fluid can be continuously provided air or oil at a low pressure. The same side of the piston can alternatively be subjected to force by mechanical means, by the sorts of springs conventionally employed for this purpose, for example. Piston rod 61 has a groove 69 around it. Groove 69 has a trapezoidal cross-section. Between the partition 65 in cylinder 60 and second piston 66 is a segmented ring 70. The inside diameter of ring 70 matches the diameter at the base of the groove 69 in piston rod 61. The ring's outside diameter is dimensioned to allow the inner surface of the bore 67 through second piston 66 to slide over it. The cross-section of the segments is symmetrical, and the contour resting against the inner demarcating surface of ring 70 matches the trapezoidal cross-section of the groove 69 around piston rod 61.

Figure 23:
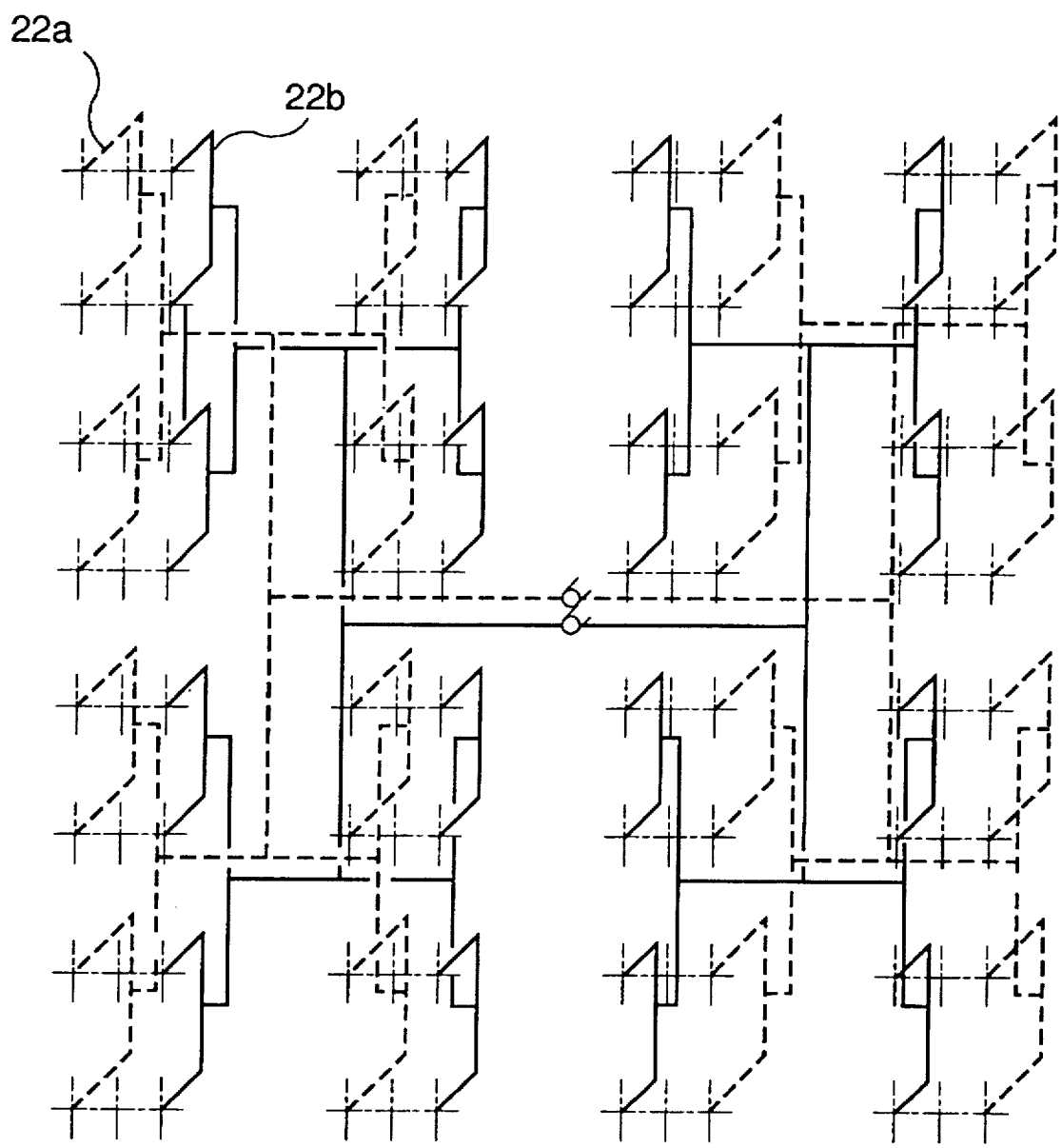
FIG. 23 is a schematic representation of the molten-component conveying channels.

The molten-component conveying channels 22a and 22b schematically illustrated in FIG. 23 are intended for a tool with thirty-two cavities. The figure demonstrates that both channels have the same length.

FIG. 24 is a graph of mass flow over time in an embodiment of the present invention accommodating the injection-molding die 16 illustrated in FIG. 8.

List of Parts

1: component A plasticizer
2: component B plasticizer
3: intermediates
4: intermediate-section obstructing bolt
5: molten-component collector
6: component A machine die
7: component B machine die
8: module 8
9: melt filter
10: component A mold-on bushing
10.1: component A mold-on bushing heater
11: component B mold-on bushing
11.1: component B mold-on bushing heater
12: component A intermediate hot-runner block
13: component B intermediate hot-runner block
14: component A block part
15: component B block part 16: injection-molding die
16a: outer injection-molding die part
16b: inner injection-molding die part
16.1: motion-control contour
17: injection-molding die stopper
19: intermediate hot-runner sections
20: block-part heaters
21: injection-molding die-stopper supporting plate
22a: molten component-A conveying channel
22b: molten component-B conveying channel
23: base plate
24: lower-die insert
25: threaded slide
26: threaded-slide core
27: alignment sleeve
28: sliding strip
29: core-cooling pipe
30: head
31: hot-runner plate
32: lower-die plate
33: slide strips
34: strip-off plate
35: core-ground plate
36: centering ring
37: heater
38: annular support
39: alignment bushing
40: mold-on insert
41: mold-on ring
42: displacement-and-rotation die stopper
43: initial-stage molding
44: slot-shaped vent
45: air-escape channel
46: vacuum channel
47: line
48: reservoir
49: line
50: vacuum pump
52: guide strip
53: gap
54: sloping cog
55: terminating plate
56: cogged rack
55: terminating plate
57: actuating strip
58: die-stopper cogwheel
59: alignment bushing
60: cylinder
61: piston rod
62: piston
63: first chamber
64: second chamber
66: second piston
67: bore
68: line
69: groove
70: segmented ring

We claim:

1. Apparatus for injection molding of three-layer moldings, in form bottle blanks with an inner layer and an outer layer of polyethylene terephthalate and a middle layer of recycled polyethylene terephthalate, comprising: a mold with a plurality of cavities; a first molten-component conveying channel for supplying said inner and outer layers with a first material; a second molten-component conveying channel for supplying said middle layer with a second material; means for heating said first and second channels separately and regulating their temperatures independently; said first material in melted form and said second material in melted form flowing through equal distances in said first and second conveying channels; injection molding dies receiving said first material in melted form an said second material in melted form, said first material in melted form and said second material in melted form flowing uniformly into said injection molding dies; a plasticizer in each said channel for plasticizing said first material and said second material; a first block part with individual heater accommodating said first conveying channel, and a second block part with individual heater accommodating said second conveying channel, said first block part and said second block part being mutually insulated; hot-runner blocks conveying said first material and said second material to said first block part and said second block part; said first material and said second material flowing from their respective plasticizers in said conveying channels to said dies through said hot-runner blocks and said block parts connected to said dies; a stopper in said injection molding dies and having translation and rotation motions; a first contour on said stopper for controlling said motions; a second contour in said injection molding dies and operating in conjunction with said first contour; said stopper having a pin at a front side of said stopper for controlling flows of said first material and said second material into said dies.

2. Apparatus as defined in claim 1, including a mold-on bushing with a heater for salt first material and a mold-on bushing with a heater for said second material between machine dies.

3. Apparatus as defined in claim 1, wherein said injection molding dies comprise an outer die part and an inner die part, said first channel being annular and located between said outer die part and said inner die part; said second channel extending along a central axis of said inner die part; and additional heating means outside of said inner die part.

4. Apparatus as defined in claim 3, wherein said die parts are mutually eccentric and have cross-sections and lengths dimensioned for generating said uniform flow front.

5. Apparatus as defined in claim 4, wherein said die parts have an eccentricity substantially between 0.3 to 1 mm.

6. Apparatus as defined in claim 3, wherein said outer die part is of a material having a heat conductivity of at least 130 W/m.K, said inner die part being of a material having a heat conductivity of substantially 240 W/m.K.

7. Apparatus as defined in claim 6, wherein said material of said outer die part is molybdenum and said material of said inner die part is a copper alloy.

8. Apparatus as defined in claim 1, including a melt filter in said plasticizer for said second material.

9. Apparatus as defined in claim 1, including stopper means in a supporting plate for stopping up said injection-molding dies; said supporting plate having displacement-generating means for synchronized opening and closing of all said cavities.

10. Apparatus as defined in claim 9, wherein said displacement-generating means comprises a hydraulic system actuated by two lateral guide strips with sloping cogs separated by gaps.

11. Apparatus as defined in claim 9, wherein said stopper means has an end with a pinion remote from said injection-molding die; a rack attached to said displacement-generating means by an actuating strip and engaging said pinion.

12. Apparatus as defined in claim 11, including a cold head plate holding said rack; a cogwheel in a section of said stopper means, said section extending into said cold head plate and engaging said rack.

13. Apparatus as defined in claim 1, including an initial-stage molding having an end with a slot-shaped vent remote from said injection molding die and between a core and a threaded slide; an air-escape channel between said core and an alignment sleeve, said vent opening into said air-escape channel; a reservoir evacuated by a pump during injection molding, said air-escape channel communicating through a vacuum channel with a line leading to said reservoir.

14. Apparatus as defined in claim 1, wherein said individual heaters in said block parts are embedded in heat-conducting cement with heat sensors.

15. Apparatus as defined in claim 14, including intermediate hot-runner sections of a material substantially non-conductive to heat.

* * * * *